(12) United States Patent
Vaughan et al.

(10) Patent No.: US 10,807,740 B2
(45) Date of Patent: Oct. 20, 2020

(54) SUN SYNCHRONOUS ORBIT (71) Applicant: Blue Digs LLC, Wilmington, DE (US)

(72) Inventors: Robert Vaughan, Redondo Beach, CA (US); James Scott, Manhattan Beach, CA (US); Ryan Reid, Los Angeles, CA (US); Robert Hawkins, Hermosa Beach, CA (US); John Sullivan, Manhattan Beach, CA (US)

( * ) Notice: Subject to any disclaimer, the term of this patent is extended or adjusted under 35 U.S.C. 154(b) by 374 days.

(21) Appl. No.: 15/672,158

(22) Filed: Aug. 8, 2017

(65) Prior Publication Data

US 2018/0305042 A1 Oct. 25, 2018

Related U.S. Application Data (60) Provisional application No. 62/489,383, filed on Apr. 24, 2017.

(51) Int. Cl.
*B64G 1/10* (2006.01)
*H04B 7/185* (2006.01)
*H04B 7/19* (2006.01)

(52) U.S. Cl.
CPC ....... *B64G 1/1007* (2013.01); *H04B 7/18584* (2013.01); *H04B 7/19* (2013.01); *H04B 7/18534* (2013.01)

(58) Field of Classification Search
CPC ..... B64G 1/1007; B64G 1/1085; B64G 1/242
See application file for complete search history.

(56) References Cited

U.S. PATENT DOCUMENTS

| 5,553,816 A * | 9/1996 | Perrotta | H04B 7/195 244/158.4 |
| 6,011,951 A * | 1/2000 | King | H04B 7/195 455/13.2 |
| 6,731,613 B1 * | 5/2004 | Provance | H04W 52/343 370/230 |

(Continued)

FOREIGN PATENT DOCUMENTS

| WO | 96/12356 | 4/1996 |
| WO | 97/18128 | 5/1997 |

OTHER PUBLICATIONS

Sidibeh et al., "Wireless Communication in LEO Satellite Formations", Adaptive Hardware and Systems, 2008, pp. 255-262.

*Primary Examiner* — Timothy D Collins
*Assistant Examiner* — Terri L Filosi (57) ABSTRACT

A satellite system may have a constellation of communications satellites that provides services to users with electronic devices such as portable electronic devices and home/office equipment. A network operations center may use gateways to communicate with the satellite constellation. The satellite constellation may include sets of satellites with different orbits such as circular orbits with different inclinations, sets of satellites with elliptic orbits, sets of satellites with circular orbits of different altitudes including low earth orbits, medium earth orbits, and/or geosynchronous orbits, sets of satellites with sun synchronous orbits, and/or sets of satellites with other orbits. The orbits of the satellites in the constellation may be selected to provide coverage to desired user population concentrations at different locations on the Earth, while reducing the amount of capacity that goes unused (e.g., is idle) at one or more times of day.

21 Claims, 5 Drawing Sheets

(56) References Cited

U.S. PATENT DOCUMENTS

| | | | |
|---|---|---|---|
| 8,930,048 B1* | 1/2015 | Batla | B64G 1/007 244/158.4 |
| 2016/0094288 A1* | 3/2016 | Krebs | H04B 7/18584 455/12.1 |
| 2018/0172823 A1* | 6/2018 | Tyc | G01S 19/13 |

* cited by examiner

SUN SYNCHRONOUS ORBIT

This application claims the benefit of provisional patent application No. 62/489,383, filed on Apr. 24, 2017, which is hereby incorporated by reference herein in its entirety.

FIELD

This disclosure relates generally to satellite systems for communications, including the use of a sun synchronous orbit to provide coverage in a period of high demand.

BACKGROUND

Communications systems often use satellites to convey data. Satellite-based systems allow information to be conveyed wirelessly over large distances, such as oceans. For example, satellite-based systems can be used to convey information to land-based devices such as handheld equipment and home or office equipment. Further, satellite communications systems can be used to provide coverage where physical infrastructure has not been installed and/or to mobile devices that do not remain attached to an infrastructure resource.

It can be challenging to implement an effective satellite-based communications system. If care is not taken, satellites may be deployed inefficiently, leading to elevated costs and suboptimal ground coverage. Further, if a satellite-based communications system is designed to serve a period of highest demand, resources may remain idle during periods of lower demand. Moreover, a conventional satellite-based communication system designed for a particular demand level may not be able to dynamically increase capacity in response to higher demand.

SUMMARY

A satellite system may have a satellite constellation of communications satellites that provides services (e.g., voice and/or data services) to electronic devices, such as portable electronic devices and home/office equipment. A network operations center may use gateways to communicate with the satellite constellation.

The satellite constellation may include sets of one or more satellites, with each set having different orbits. The satellite constellation may, as an example, include any/all of a set of satellites with circular orbits having different inclinations, a set of satellites with elliptic orbits, a set of satellites with circular orbits of different altitudes including low earth orbits (LEO) (of one or more different altitudes), medium earth orbits (MEO), and/or geosynchronous orbits (e.g., highly inclined geosynchronous orbits), sun synchronous orbits and/or other sets of satellites.

The orbits of the satellites in the satellite constellation may be selected to enhance service efficiency. For example, one or more orbits may be selected to concentrate coverage over user population centers at various locations on the Earth. Additionally or alternatively, one or more orbits may be selected to accommodate peaks in demand that coincide with particular times of day. Such a design may help reduce the number of satellites needed to provide a desired amount of coverage.

DETAILED DESCRIPTION

The present disclosure, including the accompanying drawings, is illustrated by way of examples and not by way of limitation.

Figure 1:
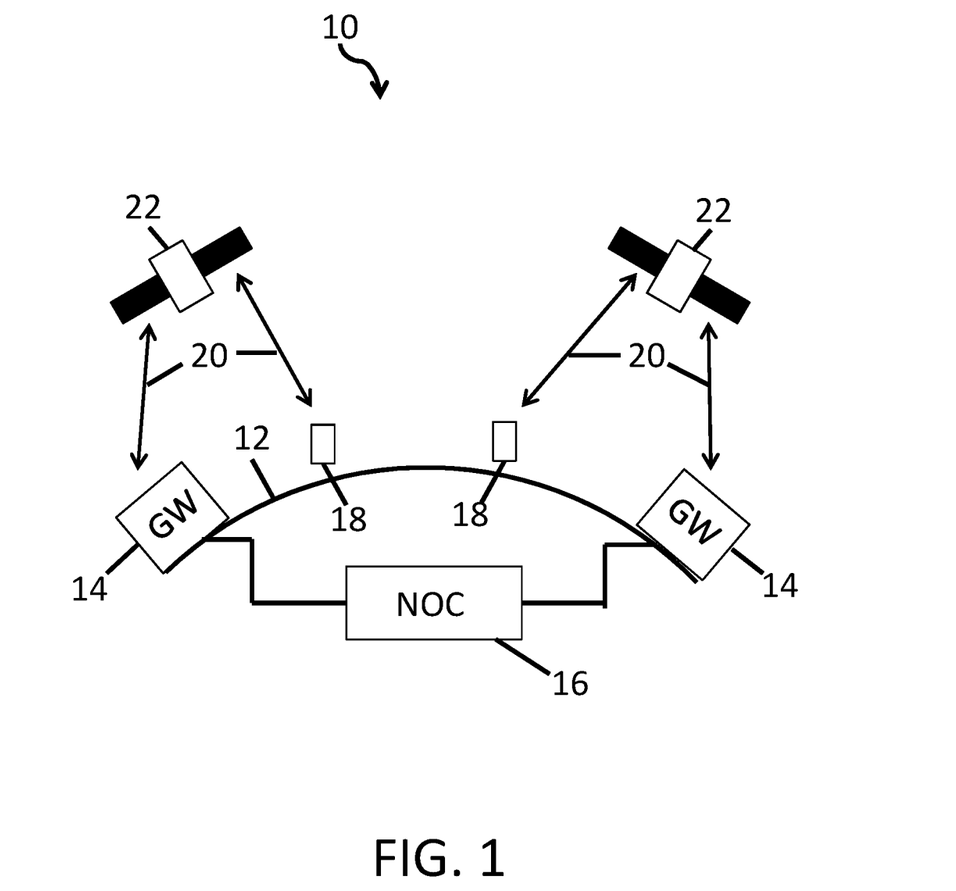
FIG. 1 presents a diagram of an example communications system including satellites, in accordance with some embodiments.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and other equipment. For example, wireless services can be provided to handheld devices, wearable devices, set-top boxes, media devices, mobile terminals, computing devices, sensors, etc. An illustrative communications system with satellites is shown in FIG. 1. As shown in FIG. 1, system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of system 10 (e.g., 10-100, 1,000-10,000, more than 100, more than 1000, fewer than 10,000, etc.).

Satellites 22 may deliver wireless services to equipment such as electronic devices 18. Electronic devices 18 may include handheld devices and/or other mobile devices, such as cellular telephones, tablet computers, laptop computers, wristwatches and other wearable devices, mobile terminals, drones, robots, and other portable electronic devices. Electronic devices 18 may also include stationary (or less portable) equipment, such as set-top boxes (e.g., satellite receivers), routers, home base stations, televisions, desktop computers, ground terminals (e.g., gateways), and other electronic equipment. Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways, e.g., gateways 14. There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

In at least some embodiments, the demand for communications services can be represented as a function of location and time of day. For example, densely populated regions (e.g., cities) can have higher demand than less populated regions (e.g., mountain and/or rural areas). Further, the demand in a given area may not be constant throughout the day, e.g., because user activity/demand (individually and/or as a group) such as business and social activities, may vary throughout the day. Accordingly, there may be a greater demand for communications services during one or more periods of the day than at other times of the same day, e.g., early evening hours compared to late night hours.

Depending on how significantly demand varies throughout the day, it may be inefficient to implement a constellation that meets the capacity demands during peak busy hours and is under-utilized for the remainder of the day. Instead, a constellation can be implemented with one or more assets that provide "surge" capacity, e.g., additional capacity relative to a baseline capability that is available only during one or more higher demand periods of the day (e.g., during a predetermined daylight period, during a predetermined period of time after dark, during a high-demand period such as from 7 PM to 10 PM, etc.). In some embodiments, such a surge capacity can be implemented using one or more satellites in a sun synchronous orbit, where the sun synchronous satellite provides coverage over a particular region during a period of high demand. As a result, a constellation can be structured to provide a lower average-capacity level throughout a day, while utilizing a smaller number of satellites, e.g., in sun synchronous orbit, to efficiently meet demand in particular regions during specific periods of increased demand.

A sun synchronous orbit can be implemented as a near polar orbit in which the altitude and inclination of a satellite are configured such that the nodal regression rate matches the Earth's orbit rate and consequently, the sun synchronous satellite crosses the equator at the same local time of day during each orbit. Thus, with respect to the ground, the sun synchronous satellite passes overhead at the same time of day each day. By using a sun synchronous orbit, variable capacity can be supplied for a geographic region in order to satisfy demand that varies based on time of day. Accordingly, orbit planes can be selected such that one or more satellites pass over a region every day during a period of increased demand, e.g., during peak traffic hours. As a result, a constellation configuration can provide increased (e.g., peak) capacity where and when it is needed, without increasing the capacity of the constellation at all times and locations. Therefore, the constellation can be implemented using a reduced number of satellites, which decreases the cost of the constellation, the number of launches needed to implement the constellation, and the time needed to bring the constellation's services to market, among other advantages. A constellation including sun synchronous satellites provides an economical means to supplement other orbits to meet global services with daily time of day demand cycles. By way of example, use of satellites in sun synchronous orbits in this manner can effectively double the constellation capacity while only increasing the number of satellites by approximately 30%.

Figure 2:
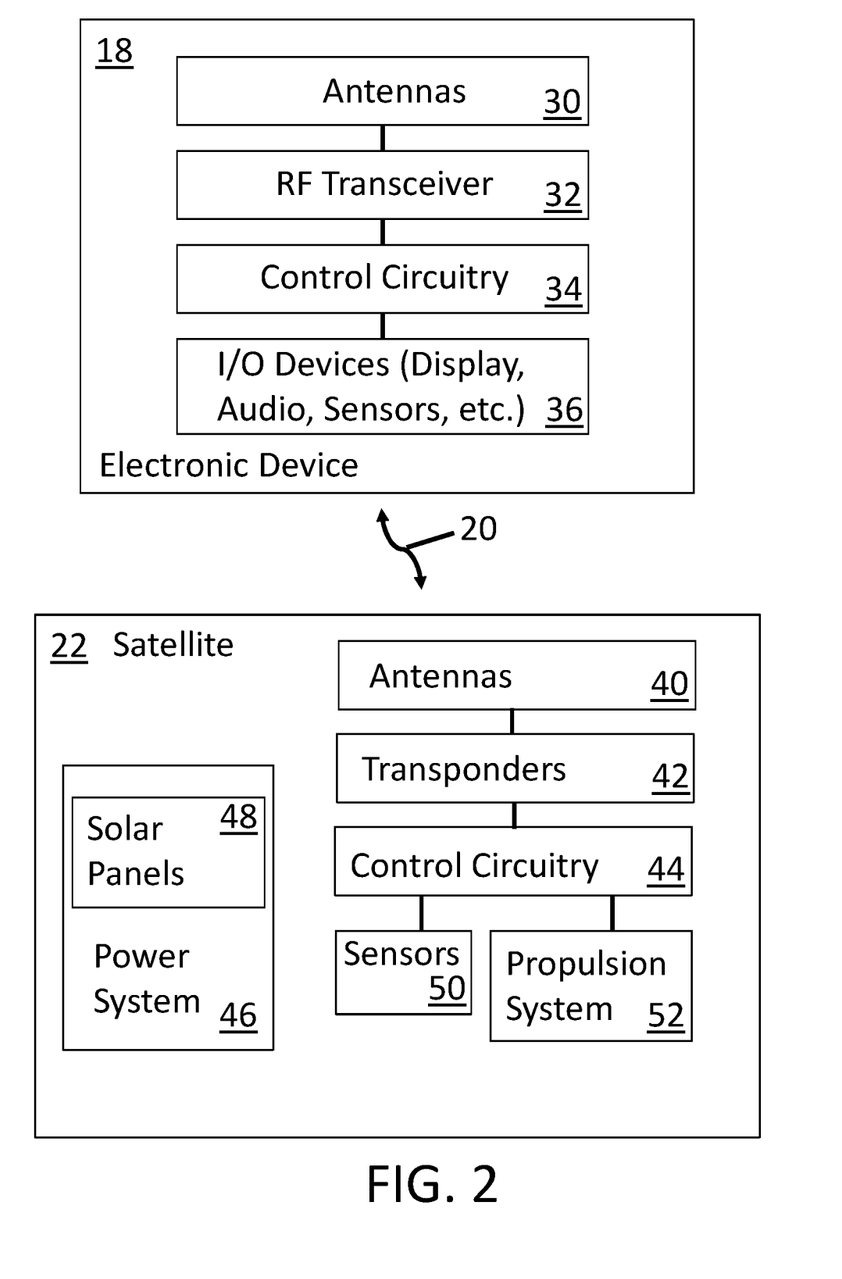
FIG. 2 presents a schematic diagram showing an example of an electronic device in communication with a communications satellite, in accordance with some embodiments.

FIG. 2 presents a schematic diagram of an illustrative electronic device 18 in communication, over a wireless communications link 20, with an illustrative satellite 22. As shown in FIG. 2, electronic device 18 may include one or more antennas 30. Antennas 30 may include monopoles, dipoles, and/or other types of antenna elements. Antennas 30 may, for example, include loop antennas, helical antennas, patch antennas, inverted-F antennas, Yagi antennas, slot antennas, horn antennas, cavity antennas, dish antennas, arrays of antennas (e.g., a phased antenna array that supports beam steering operations), or other suitable antennas. The antennas 30 can be implemented such that they are suitable for communication with one or more satellites using one or more satellite communications bands. Radio-frequency transceiver circuitry 32 may include radio-frequency receiver circuitry and/or radio-frequency transmitter circuitry that allows electronic device 18 to transmit and/or receive wireless signals over wireless communications link 20 using one or more antennas 30. Electronic device 18 may also include control circuitry 34 and input-output devices 36. Control circuitry 34 may include storage, such as solid-state drives, random-access memory, and/or hard disk drives and other volatile and/or nonvolatile memory. Control circuitry 34 may also include one or more microcontrollers, microprocessors, digital signal processors, communications circuits with processors, application specific integrated circuits, programmable logic devices, field programmable gate arrays, and/or other processing circuitry. During operation, control circuitry 34 may run code (instructions) that is stored in the storage of control circuitry 34 to implement desired functions for electronic device 18.

Control circuitry 34 may use input-output devices 36 to supply output to an interface configured to render output perceivable by a user and/or to external equipment, and may gather input received from a user and/or external source(s). Input-output devices 36 may include displays configured to present images, audio devices (e.g., speakers and/or microphones), sensors, controls, and other components. For example, input-output devices 36 may include user input devices such as one or more buttons, touch screens, sensors (e.g., accelerometers and/or gyroscopes), microphones for gathering voice commands, and/or other components for gathering input from a user. Further, input-output devices 36 may include speakers, light-emitting components, displays, vibrators and/or other haptic output devices, and other equipment for supplying a user with output. Input-output devices 36 may include sensors such as force sensors, position sensors, gyroscopes, magnetic sensors, accelerometers, capacitive touch sensors, proximity sensors, ambient light sensors, temperature sensors, moisture sensors, gas sensors, pressure sensors, and other sensors for gathering information representative of the environment in which electronic device 18 is located.

A satellite, such as satellite 22, may include one or more antennas 40. Antennas 40 may be based on any suitable type(s) of antenna elements (e.g., antenna elements such as monopoles or dipoles, loop antennas, helical antennas, patch antennas, inverted-F antennas, Yagi antennas, slot antennas, horn antennas, cavity antennas, etc.). Antennas 40 may be used in any suitable type(s) of antenna arrays (e.g., phased antenna arrays, fixed direct radiating arrays, deployable direct radiating antenna arrays, space fed arrays, reflector fed arrays, etc.). The antennas 40 can be implemented such that they are suitable for communication with one or more electronic devices 18, gateways 14, or other communication devices/nodes using one or more satellite communications bands.

Satellite 22 may include transceiver circuitry that is communicatively coupled (directly or indirectly) to antennas 40. The transceiver circuitry may include one or more components, such as one or more transponders 42 for receiving uplink signals and transmitting downlink signals, e.g., over links 20. Further, control circuitry 44 may be used to control the operation of satellite 22. Control circuitry 44 may include storage and/or processing circuits of the type used in control circuitry 34.

Power may be supplied to satellite 22 from power system 46. Power system 46 may include one or more solar panels 48 (or arrays of solar panels) for converting energy from the sun into electrical power. Power system 46 may include power regulator circuitry and batteries for storing electrical power generated by solar panels 48, and for distributing power to the components of satellite 22. Control circuitry 44 may receive information from one or more sensors 50. Further, control circuitry 44 may receive commands from NOC 16 and, using information from one or more sensors and/or received commands, may perform maintenance and/or control operations (e.g., software updates, operations related to the deployment and operation of solar panels 48, diagnostic routines, altitude adjustments and other orbital adjustments using propulsion system 52, etc.). Sensors 50 may include light-based sensors (e.g., infrared cameras, visible light cameras, etc.), lidar, radar, sensors that measure backscattered light and/or backscattered radio-frequency signals, temperature sensors, radiation sensors, accelerometers, gyroscopes, magnetic sensors, spectrometers, and/or other sensors. Sensors 50 may be used in performing remote sensing operations, fault detection, satellite positioning, and other operations.

It may be desirable for the constellation of satellites 22 in system 10 to include satellites with different types of orbits. As an example, satellites 22 may include orbits with different altitudes, eccentricities, inclinations, and other orbital attributes. One or more sun synchronous satellites (or a satellite in a sun synchronous orbit) may be included in the constellation of satellites 22 in system 10. The one or more sun synchronous satellites can be configured to help meet demand (e.g., as measured in throughput, the number of simultaneous connections, or other such measures) during a high-demand period, such as during an afternoon or evening period. By combining different orbital types within the same satellite constellation, satellite resources can be deployed with enhanced efficiency.

Figure 3:
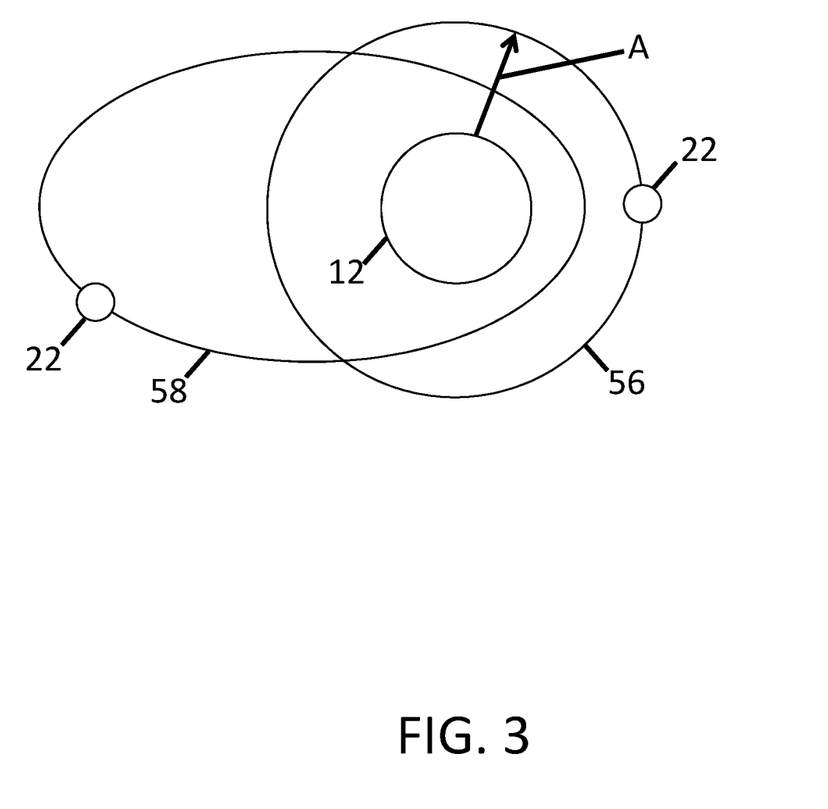
FIG. 3 presents a diagram of illustrative satellite orbits around the Earth, in accordance with some embodiments.

FIG. 3 is a diagram of two illustrative satellite orbits (geocentric orbits) about the Earth 12. A satellites 22 may orbit in a circular orbit as shown by illustrative circular orbit 56 or in an elliptic orbit such as elliptic orbit 58. A circular orbit is characterized by an eccentricity of 0. An elliptical orbit has an eccentricity of greater than 0.

A satellite in a circular orbit may be characterized by an orbital altitude A, as shown in FIG. 3. Satellites 22 may orbit at any altitude suitable for their intended purpose. For example, a satellite 22 may orbit Earth 12 in low earth orbit (e.g., at an altitude A of 500-1500 km), in geosynchronous orbit (at an altitude A of approximately 35,800 km), or in medium earth orbit (e.g., between low earth orbit and geosynchronous orbit). Examples of medium earth orbits include semi-synchronous orbits and Molniya orbits. Semi-synchronous orbits have an altitude of about 20,000 km and are characterized by an orbital period of half of one sidereal day. A Molniya orbit has an eccentricity of greater than zero and a perigree location in the Southern Hemisphere so a satellite in this type of orbit will spend most of its orbital time above the Northern Hemisphere or vice versa. A Tundra orbit is an elliptical orbit (with an eccentricity greater than zero) that has twice the orbital period of a Molniya orbit. Other elliptical orbits may be used, if desired (e.g., orbits with eccentricities of at least 0.3, at least 0.5, at least 0.7, less than 0.8, etc.).

Figure 4:
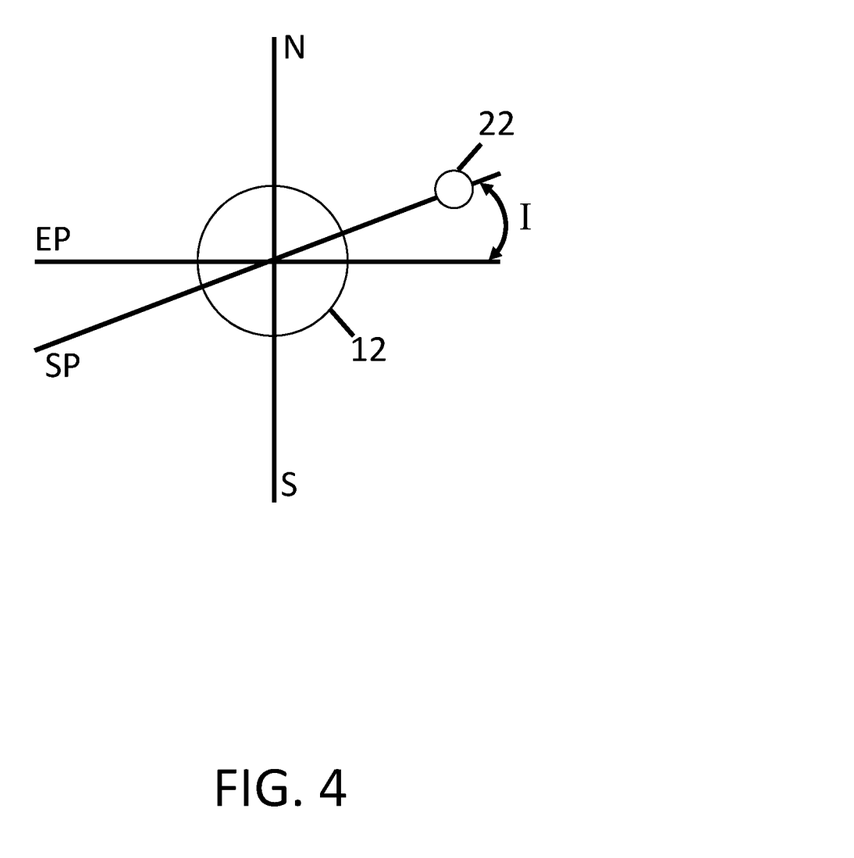
FIG. 4 presents a diagram of the Earth and an associated inclined satellite orbit, in accordance with some embodiments.

If desired, a satellite may have an inclined circular orbit (a circular orbit out of the equatorial plane). Consider, as an example, satellite 22 of FIG. 4. In the diagram of FIG. 4, satellite 22 is orbiting about Earth 12 in satellite orbital plane SP. Plane SP is inclined at inclination (inclination angle) I with respect to equatorial plane EP, which is a plane that is aligned with the Earth's equator. Polar orbits (sometimes referred to as nearly polar orbits) are orbits that pass over the north and south poles and are therefore characterized by inclinations of about 90° (e.g., at least 85°, at least 88°, at least 89°, 90°, less than 90°, or other suitable polar orbit inclination).

One or more of satellites 22 in the satellite constellation of system 10 may have a sun synchronous orbit. Sun synchronous orbits (heliosynchronous orbits) are polar orbits (near polar orbits) that pass the equator (or other given latitude) at the same local time each day. The altitude and inclination of a sun synchronous orbit are such that the nodal regression rate matches the Earth orbit rate. As a result, to a user on the ground, a sun synchronous satellite will pass overhead at the same time of day each day. Because satellites with sun synchronous orbits are available to handle communications traffic at the same local time each day, the inclusion of one or more sun synchronous satellites in the satellite constellation of system 10 may help the satellite constellation to efficiently meet peak traffic demands.

In general, each type of orbit that is included in the satellite constellation of system 10 may help augment the performance of the constellation in a different way. For example, an elliptic orbit such as Molniya or Tundra orbit may be used to provide capacity to a user population center at a particular longitude and/or latitude (or range(s) thereof) in the Northern or Southern Hemisphere (e.g., a population center in Europe, North America, Australia, or Asia). Further, sun synchronous orbits may be used to provide capacity that is concentrated on one or more high-demand times of day (e.g., mornings or evenings). Inclined circular orbits may be used to provide coverage over a desired range of latitudes. Low-earth orbits may help reduce latency (e.g., for traffic that involves voice telephone calls and other latency-sensitive traffic) and may help reduce transmit and receive powers. Medium-earth orbits and geosynchronous orbits may help increase coverage, reducing the total number of satellites needed to service a given region and may be well suited to broadcast-type traffic (e.g., media distribution services such as television services, music services, etc.).

Consider, as an example, an arrangement in which multiple sets of satellites 22 are included in the satellite constellation, each of which has a circular low earth orbit with a different respective orbital inclination. The coverage (probability density) of an inclined orbit is concentrated at the inclination angle I (e.g., at +I in the Northern Hemisphere and at −I in the Southern Hemisphere). As a result, if there is a first user population concentration at 55° and a second user population concentration at 48° (as an example), the satellite constellation may effectively serve the user population concentrations at these two latitudes by including at least a first set of satellites with a 55° orbital inclination and a second set of satellites with a 48° orbital inclination. One or more additional sets of (one or more) satellites with different respective orbital inclinations may be included, if desired (e.g., one or more additional sets, two or more additional sets, 2-5 additional sets, 3-10 additional sets, etc., with each set including one or more satellites).

In addition to accommodating one or more concentrations of user population, e.g., at particular latitudes (e.g., latitudes associated with large metropolitan areas) by forming the satellite constellation of system 10 from multiple sets of satellites 22 each with a different respective orbital inclination, the satellite constellation of system 10 may include one or more sun synchronous satellites 22 to accommodate peaks in traffic (e.g., as measured by throughput, number of simultaneous connections, etc.) at one or more high-demand times of day.

Figure 5:
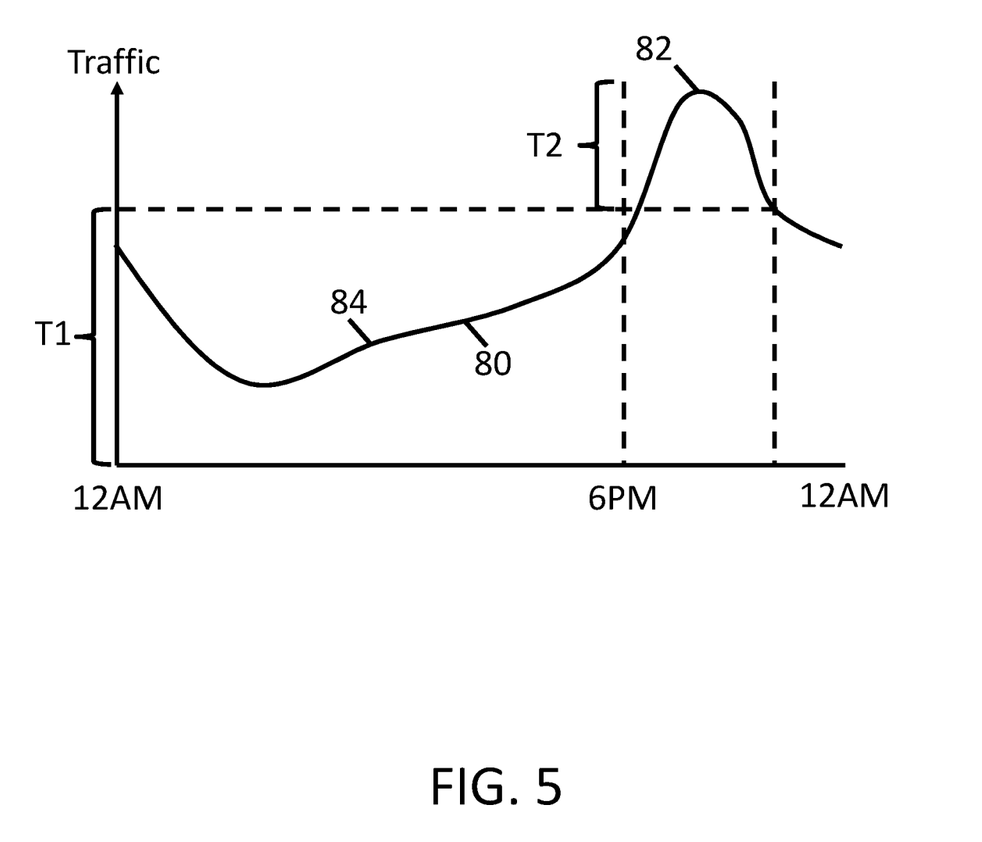
FIG. 5 presents a graph in which an illustrative data traffic demand curve is plotted as a function of time of day, in accordance with some embodiments.

Consider, as an example, the illustrative traffic versus time-of-day curve (curve 80) of FIG. 5. As shown in FIG. 5, the communications services provided by the satellite constellation of system 10 may experience significant variations in demand throughout the day. The services provided by system 10 may include, for example, any/all of voice and video calling services, data services, and media distribution services (television, audio, etc.). In the early morning hours, when users are mostly asleep, demand is low (see, e.g., low demand period 84 of curve 80 of FIG. 5). As a population of users awakens, demand for communications tends to rise. In at least some embodiments, data traffic (voice, internet, media distribution, etc.) can increase, and possibly peak, in the evening hours, e.g., as users returning home from work begin to watch television, communicate, access social media, and consume other media/content. As illustrated by peak 82 of curve 80, for example, demand for communications services may increase (and possibly peak) between about 5 PM and 10 PM in the evening.

Demand in a geographic region that increases (or peaks) at a particular time of day can be accommodated efficiently using one or more sun synchronous satellites that are configured to be overhead during the time of day associated with higher (e.g., peak) demand. To accommodate time-of-day traffic increases, such as peak 82 of FIG. 5, for example, the satellite constellation of system 10 may include one or more sun synchronous satellites that pass over a particular latitude or range of latitudes (e.g., Northern Hemisphere latitudes) during a period of relatively higher demand, e.g., the 5 PM to 10 PM traffic peak. As an example, a first set of sun synchronous satellites 22 may be used to provide additional coverage during a period of increased demand, e.g., at about 5 PM, and may pass overhead at the time of the increased demand, e.g., 5 PM, each day. Depending on the duration of the additional coverage of the first set of sun synchronous satellites 22 and the duration of the increased demand, one or more additional sets of sun synchronous satellites can be included in the constellation. For example, a second set of sun synchronous satellites 22, which can be located in a different sun synchronous orbital plane than the first set of sun synchronous satellites 22, may be used to provide additional coverage during another period of increased demand, e.g., occurring at around 7 PM, and may pass overhead at the time of the increased demand, e.g., 7 PM, each day. Additional sets of sun synchronous satellites, e.g., each in a respective different sun synchronous orbital plane, may be used to address increased demand at other times, such as 8 PM, 9 PM, and/or 10 PM (as examples). The number of sets of one or more sun synchronous satellites included in the constellation can be selected to correspond to the periods and/or durations of increased demands in one or more regions serviced by the constellation. For example, in such implementations, there may be, e.g., six separate sun synchronous orbital planes staggered apart from each other by, e.g., one hour each. In some embodiments, the sun synchronous orbital planes may have a near polar inclination (e.g., 97.6° or other suitable inclination) and may have an altitude of approximately 550 km (e.g., more than 500 km, less than 600 km, or other suitable altitude). There may be any suitable number of satellites 22 orbiting within each of these six sun synchronous orbital planes (e.g., 3-10 satellites per plane, up to 50 satellites per plane, more than 25 satellites per plane, fewer than 100 satellites per plane, etc.). In some other embodiments, the sun synchronous orbital planes may have a different inclination and/or altitude. Further, in some embodiments, the inclination and/or altitude can differ between the sets of satellites in the sun synchronous orbital planes.

With this type of arrangement, sun synchronous satellites may, for example, handle increased (e.g., peak) traffic T2, whereas other satellites in the constellation, e.g., low earth orbiting satellites with a series of different orbital inclinations (e.g., orbital inclinations of less than 70°, less than 65°, etc.) may be used to handle traffic T1. If desired, one or more geostationary satellites (e.g., geostationary satellites with inclined orbits), medium earth orbit satellites, and/or satellites with elliptical orbits may be included in the constellation to handle traffic that is concentrated at particular geographic locations (e.g., particular longitudes and latitudes, such as the eastern part of North America, etc.).

As these examples demonstrate, incorporating sets of satellites with different orbital inclinations, sets of satellites in sun synchronous orbits (e.g., sun synchronous orbits aligned with one or more increased (e.g., peak) traffic time periods during the day), sets of satellites with geosynchronous orbits, and/or sets of satellites with medium earth orbits (e.g., circular and/or elliptical) may satisfy traffic demands effectively without requiring excessive satellites resources (e.g., resources that would remain idle at other periods of the day).

Within the constellation of satellites 22 in system 10, each group of satellites 22 that share a common orbit (e.g., a common orbital inclination and altitude for a set of low earth orbiting satellites with circular orbits, a common elliptical orbital type for a set of medium earth orbit satellites, a common sun synchronous orbit, a geocentric orbit, etc.), may include any suitable number N of satellites 22. For example, N may be 1-100, 10-1000, 10-10,000, 20-500, at least 10, at least 50, at least 100, at least 200, fewer than 10,000, fewer than 1000, fewer than 500, fewer than 100, or other suitable number. Further, the number of satellites 22 that share a common orbit may be adjusted over time.

Satellites 22 in the constellation of satellites may have the same types of antenna arrays (with the same types of antenna elements), may have different types of antennas (e.g., one type of antenna array may be used for low earth orbit satellites, another type of antenna array may be used for sun synchronous satellites, and another type of antenna array may be used for geosynchronous satellites), may have different types of power systems (e.g., different power sources, different numbers of solar panels per satellite, etc.), or may have a common type of power system (e.g., a power system that has the same type and number of solar panels, etc.), may have different satellite buses or may share a common satellite bus architecture, may have different propulsion systems, may share a common type of propulsion system, etc. The satellites in the satellite constellation of system 10 may be communications satellites (e.g., satellites that handle voice and data traffic, audio and/or video media broadcasts such as broadcasts of television traffic, and/or that handle other suitable types of communications traffic). Different sets of satellites (having the same or different components) may have different eccentricities, altitudes (e.g., different circular orbit altitudes), inclinations, and/or other different orbital attributes. For example, one, two, three, four, or five or more sets of satellites may have circular low earth orbits with different respective inclinations (e.g., inclinations of 0-80°, 10-60°, 30-60°, more than 30° less than 80°, less than 60°, less than 70°, or other suitable inclinations) and one, two, three, four, or five or more of these orbits may have altitudes that are under a given altitude, whereas one or more additional sets of satellites may have altitudes that are greater than the given altitude. If desired, one or more of these additional sets of satellites may be geosynchronous and one or more of these additional sets of satellites may be characterized by medium earth orbits. One or more sets of satellites with one or more different respective elliptic orbits (different respective eccentricities) may be included in the satellite constellation, if desired. Sets (groups) of satellites with sun synchronous orbits may be included to help accommodate one or more daily peaks in traffic.

In accordance with an embodiment, a satellite constellation is provided that includes a plurality of communications satellites having circular orbits with inclinations of 10-60°, and at least one sun synchronous communications satellite having a sun synchronous orbit.

In accordance with another embodiment, the plurality of communications satellites having circular orbits includes a first set of communications satellites in low earth orbit having a first orbital inclination, and a second set of communications satellites in low earth orbit having a second orbital inclination that is different than the first orbital inclination.

In accordance with another embodiment, the satellite constellation includes at least one geosynchronous communications satellite.

In accordance with another embodiment, the satellite constellation includes at least one medium earth orbit communications satellites.

In accordance with another embodiment, the satellite constellation includes at least one communication satellite with a geostationary orbit.

In accordance with another embodiment, the plurality of communications satellites having the circular orbits includes a third set of communications satellites in low earth orbit having a third orbital inclination that is different than the first and second orbital inclinations and a fourth set of communications satellites in low earth orbit having a fourth orbital inclination that is different than the first, second, and third orbital inclinations.

In accordance with an embodiment, a satellite system is provided that includes a satellite constellation having at least a first set of sun synchronous communications satellites having sun synchronous orbits and a second set of low earth orbit (LEO) communications satellites having orbital inclinations of less than 70°, and a network operations center configured to control the satellite constellation.

In accordance with another embodiment, the satellite system includes a gateway configured to route communications between the network operations center and the satellite constellation.

In accordance with another embodiment, the satellite constellation includes a third set of geosynchronous communications satellites having geosynchronous orbits.

In accordance with another embodiment, the second set of LEO communications satellites includes a first group of communications satellites having a first orbital inclination and a second group of communications satellites having a second orbital inclination that is different than the first orbital inclination.

In accordance with another embodiment, the second set of LEO communications satellites includes a third group of communications satellites having a third orbital inclination that is different than the first and second orbital inclinations.

In accordance with another embodiment, the second set of communications satellites includes a fourth group of communications satellites having a fourth orbital inclination that is different than the first, second, and third orbital inclinations.

In accordance with an embodiment, a satellite constellation is provided that includes a first set of communications satellites, each of the communications satellites in the first set of communications satellites is characterized by an inclined circular orbit having a first inclination, a second set of communications satellites, where each of the communications satellites in the second set of communications satellites is characterized by an inclined circular orbit having a second inclination that is different than the first inclination, and a third set of communications satellites having sun synchronous orbits.

In accordance with another embodiment, the communications satellites included in the first, second, and third sets of communications satellites are characterized by low earth orbits.

In accordance with another embodiment, the third set of satellites having sun synchronous orbits are configured to provide communications capacity to a geographic region during a high-demand time of day.

In accordance with another embodiment, the satellite constellation includes a fourth set of communications satellites having medium earth orbits.

In accordance with another embodiment, the satellite constellation includes a fourth set of communications satellites having inclined geosynchronous orbits.

In accordance with another embodiment, the first set of communications satellites includes a first group of one or more low earth orbit satellites with a first orbital altitude and a second group of one or more low earth orbit satellites with a second orbital altitude that is different than the first orbital altitude.

In accordance with another embodiment, the third set of communications satellites having sun synchronous orbits includes a first group of communications satellites that orbit in a first sun synchronous orbital plane, and a second group of communications satellites that orbit in a second sun synchronous orbital plane that is different than the first sun synchronous orbital plane.

In accordance with another embodiment, at a particular time of day, the first group of communications satellites in the first sun synchronous orbital plane provides different geographic coverage than the second group of communications satellites in the second sun synchronous orbital plane.

The foregoing is merely illustrative and various modifications can be made to the described embodiments. The foregoing embodiments may be implemented individually or in any combination.

What is claimed is:

1. A satellite system, comprising:
   a satellite constellation having at least:
      a first set of communications satellites having sun synchronous orbits and configured to provide communications capacity to user equipment in a geographic region during a predetermined time of day having a higher relative demand for communications traffic than other times of day, and
      a second set of satellites having geosynchronous orbits and configured to provide communications capacity to the user equipment in the geographic region;
   a network operations center that controls the satellite constellation; and
   a gateway that routes communications between the network operations center and the user equipment in the geographic region via the satellite constellation, wherein the satellite constellation serves as a relay for radio-frequency signals that are wirelessly conveyed between the gateway and the user equipment in the geographic region.

2. The satellite system of claim 1, wherein the communications comprise data traffic and wherein the satellite constellation routes the data traffic to and from the user equipment using the radio-frequency signals.

3. The satellite system of claim 1 wherein the predetermined time of day comprises a daylight period.

4. The satellite system of claim 1 wherein the predetermined time of day comprises a time period after sunset at the geographic region.

5. The satellite system of claim 1 wherein the predetermined time of day comprises a time of day having a peak in communications traffic demand.

6. The satellite system of claim 1 wherein the sun synchronous orbits have an altitude less than 600 km.

7. The satellite system of claim 1 further comprising a third set of communications satellites in medium earth orbits and configured to provide communications capacity to the user equipment in the geographic region.

8. The satellite system of claim 1 further comprising a third set of communications satellites in orbits selected from the group consisting of: Tundra orbits and Molniya orbits, wherein the third set of communications satellites is configured to provide communications capacity to the user equipment in the geographic region.

9. The satellite system of claim 1, wherein the first set of communications satellites comprises:
   a first group of communications satellites that orbit in a first sun synchronous orbital plane; and
   a second group of communications satellites that orbit in a second sun synchronous orbital plane that is different than the first sun synchronous orbital plane.

10. A satellite constellation, comprising:
    a first set of communications satellites in medium earth orbits and configured to provide radio-frequency communications capacity to user equipment in a geographic region; and
    a second set of communications satellites in sun synchronous orbits, wherein the second set of communications satellites in the sun synchronous orbits is configured to provide radio-frequency communications capacity to the user equipment in the geographic region during a predetermined time of day having a higher relative demand for communications traffic than other times of day and wherein the first and second sets of communication satellites are configured to serve as relays for radio-frequency signals conveyed between at least one gateway on Earth and the user equipment in the geographic region.

11. The satellite constellation of claim 10 wherein the predetermined time of day comprises a daylight period.

12. The satellite constellation of claim 10 wherein the predetermined time of day comprises a time period after sunset at the geographic region.

13. The satellite constellation of claim 10 wherein the predetermined time of day comprises a time of day having a peak in traffic demand.

14. The satellite constellation defined in claim 10 further comprising:
   a third set of communications satellites in inclined circular orbits, wherein the third set of communications satellites is configured to provide radio-frequency communications capacity to the user equipment in the geographic region and wherein the third set of communications satellites is configured to serve as a relay for radio-frequency signals conveyed between the at least one gateway on Earth and the user equipment in the geographic region.

15. The satellite constellation defined in claim 10 further comprising:
   a third set of communications satellites in orbits selected from the group consisting of: Tundra orbits and Molniya orbits, wherein the third set of communications satellites is configured to provide radio-frequency communications capacity to the user equipment in the geographic region and wherein the third set of communications satellites is configured to serve as a relay for radio-frequency signals conveyed between the at least one gateway on Earth and the user equipment in the geographic region.

16. The satellite constellation defined in claim 15 further comprising:
   a fourth set of communications satellites in inclined geosynchronous orbits, wherein the fourth set of communications satellites is configured to provide radio-frequency communications capacity to the user equipment in the geographic region and wherein the fourth set of communications satellites is configured to serve as a relay for radio-frequency signals conveyed between the at least one gateway on Earth and the user equipment in the geographic region.

17. The satellite constellation defined in claim 10 wherein the second set of communications satellites comprises:
   a first group of communications satellites that orbit in a first sun synchronous orbital plane; and
   a second group of communications satellites that orbit in a second sun synchronous orbital plane that is different than the first sun synchronous orbital plane.

18. The satellite constellation defined in claim 17 wherein, at a particular time of day, the first group of communications satellites in the first sun synchronous orbital plane provides different geographic coverage than the second group of communications satellites in the second sun synchronous orbital plane.

19. A satellite constellation, comprising:
   a first set of communications satellites in orbits selected from the group consisting of: Tundra orbits and Molniya orbits, wherein the first set of communications satellites is configured to provide radio-frequency communications capacity to user equipment in a geographic region; and
   a second set of communications satellites in sun synchronous orbits and configured to provide radio-frequency communications capacity to the user equipment in the geographic region during a predetermined time of day having a higher relative demand for communications traffic than other times of day, wherein the first and second sets of communications satellites are configured to serve as relays for radio-frequency signals conveyed between at least one gateway on Earth and the user equipment in the geographic region.

20. The satellite constellation of claim 19 wherein the predetermined time of day comprises a time of day having a peak in traffic demand.

21. The satellite constellation of claim 20 wherein the second set of communications satellites comprises:
   a first group of communications satellites that orbit in a first sun synchronous orbital plane; and
   a second group of communications satellites that orbit in a second sun synchronous orbital plane that is different than the first sun synchronous orbital plane.

* * * * *